H. P. KRAFT.
VALVE.
APPLICATION FILED MAR. 21, 1919.

1,329,776.

Patented Feb. 3, 1920.

WITNESS:
Rene' Quine

INVENTOR
Henry P. Kraft,

By Attorneys,
Fraser, Turk & Myers

UNITED STATES PATENT OFFICE.

HENRY P. KRAFT, OF RIDGEWOOD, NEW JERSEY.

VALVE.

1,329,776.          Specification of Letters Patent.          Patented Feb. 3, 1920.

Application filed March 21, 1919. Serial No. 284,011.

*To all whom it may concern:*

Be it known that I, HENRY P. KRAFT, a citizen of the United States of America, residing in Ridgewood, in the county of Bergen and State of New Jersey, have invented certain new and useful Improvements in Valves, of which the following is a specification.

This invention relates to pneumatic tire valves or the like and aims to provide certain improvements therein.

The standard tire valve now in use is constructed to receive a single size of working parts, or so-called "insides," and its outer end is usually provided with a nipple of standard dimensions by which it is adapted to receive a standard pump coupling. These features in various diameters of valves secure the valuable feature of interchangeability, and for this reason, have not been departed from in practice. Recently, however, the sizes of pneumatic tires have very largely increased, particularly for use on heavy trucks, until from fourteen to sixteen inches have been reached. This produces such a capacity in the tire that the operation of pumping through the standard valve has become burdensome, due to the lack of capacity of the valve to pass sufficient air within a reasonable time to accommodate the power pumps or tanks of large capacity used for inflation purposes.

The present invention is directed to a valve which is adapted to provide a very large passageway amply able to take care of the delivery of a powerful compression pump, so that the operation of blowing up a tire is reduced to a comparatively short period.

In proceeding according to the preferred form of the invention a valve casing of not greatly enlarged diameter is used, and in place of providing a nipple at the end of the valve, this part is omitted. This permits the enlargement of the inside working parts, so that they are several times larger than the standard insides. It introduces, however, the disadvantageous feature of not fitting the standard pump couplings now in use. According to the present invention, therefore, the valve is provided with what may be called an adapter, which at one end is capable of fitting over the tire valve casing, and at the other end is capable of receiving the standard pump connection. Preferably, this adapter is so constructed that it fits bodily over the valve cap and the p...s are provided with interengaging provision, such as a screw-thread, so that they may be carried in connected condition. The invention also introduces another improvement in that means are provided in the adapter, whereby the pressure may be ascertained without removing the adapter from the valve, but merely by unscrewing the pump coupling from the adapter. This operation is an easier one, both on account of the smaller size of the pump coupling, and also because of the fact that the standard pump coupling is provided with a swivel which permits its unscrewing without kinking or twisting the hose. The invention also comprises certain other features of improvement which will be hereinafter more fully described.

Referring to the drawings which illustrate one form of the invention,—

Figure 1:
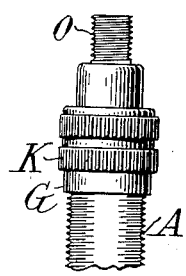
Figure 1 is an elevation of the top of a valve, showing the cap and adapter in normal running position.
Figure 2:
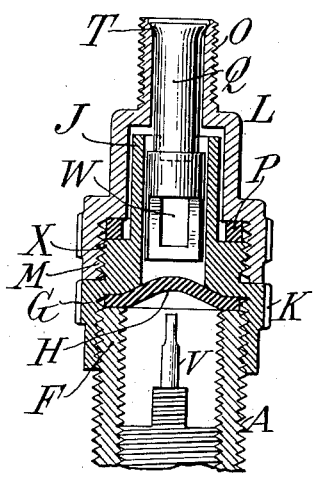
Fig. 2 is an enlarged diametrical section of Fig. 1.
Figure 3:
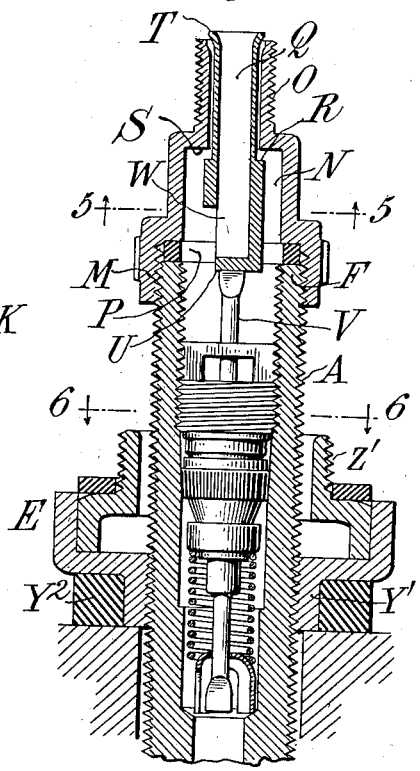
Fig. 3 is a similar section, showing the cap removed and the adapter in place upon the valve.
Figure 4:
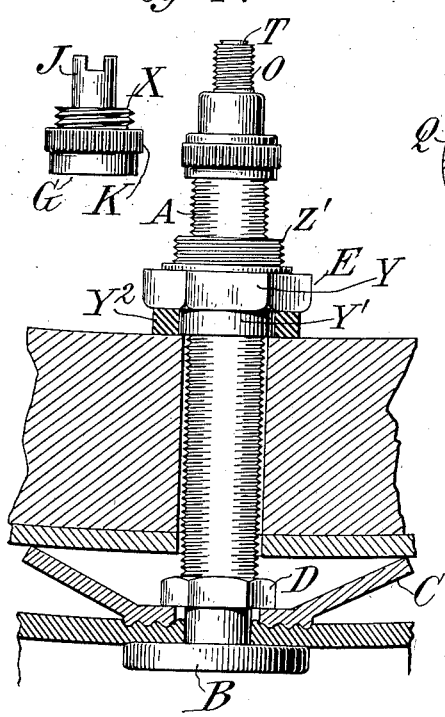
Fig. 4 is an elevation of Fig. 3, with the cap shown detached.
Figure 5:
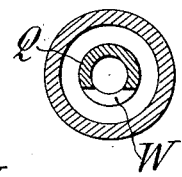
Fig. 5 is a cross-section on the line 5—5 of Fig. 3.
Figure 6:
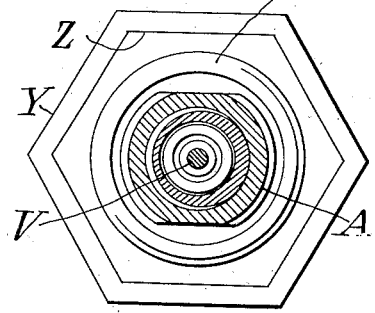
Fig. 6 is a cross-sectional view on the line 6—6 of Fig. 3.

Referring to the drawings, let A indicate a valve casing provided with the usual shoe or foot B, spreader C, and a hexagonal nut D. The valve casing is screw-threaded on its exterior, in accordance with the usual practice, and is preferably provided with a special form of nut E, hereinafter to be described.

The valve casing is of somewhat enlarged diameter as compared with the standard valve, but this diameter is kept as small as possible in order to avoid any undue weakening of the rims or felly. The top of the valve casing, as shown at F, instead of being provided with the usual nipple, is of the same diameter as the body thereof. It is adapted to receive a valve cap G, which best screws upon the outside thereof, and which carries a packing washer H, adapted to make contact with the upper edge of the valve casing. The cap is also formed with a screw-driver projection J and the usual knurl K, to facilitate its use in screwing and unscrewing the usual working parts or "insides".

L indicates the adapter as a whole, which is formed of the same general shape as the cap, having a lower screw-threaded portion M, an internal chamber N, and a screw-threaded nipple O. At the upper part of the screw-threaded portion M, is located an interior packing washer P, which is adapted to make a tight joint between the adapter and the top of the valve casing. The nipple O is best made of the standard dimensions now in use, in order that it may receive a standard pump coupling or other connection. When the adapter is screwed down upon the top of the valve casing, with a tight joint, the connected pump will deliver air into the valve in the ordinary manner. Within the nipple, and extending somewhat down below the chamber N, is a deflating pin Q which is preferably hollow, as shown. The lower part has a flange R which is adapted to contact with an internal shoulder S on the adapter, so as to prevent loss of the pin through the outer end of the adapter. The opposite end of the pin is flanged, as shown at T, in order that the pin may not drop out through the bottom of the adapter. The pin preferably has a lower imperforate portion U which is adapted to contact with the valve pin V, so that when the deflating pin Q is pressed downwardly, the valve is opened and air under pressure may then pass through the lateral opening W up into the interior of the pin and thence into the gage. By this construction, the ordinary gage may be utilized to ascertain the pressure without removing the adapter from the top of the valve casing.

Preferably, the adapter and cap are so formed that they may be connected together and carried as a unit. To this end, the adapter is best constructed to fit bodily over the cap, the screw-driver projection J entering the chamber N in the adapter, and the deflating pin Q of the adapter entering the screw-driver projection. For the purpose of holding the parts in place, I prefer to provide an external screw-thread X on the cap, which engages the threaded portion M of the adapter. The parts are thereby enabled to be screwed together in nested form, so that the total dimensions exceed only slightly those of the cap alone.

The invention also includes a novel form of nut, suitable for a rim nut or the like, which is shown generally at E. In the preferred construction of the nut, two sheet metal blanks are used, one being formed with the exterior flat faces Y, and the cylindrical extension Y', and the other being formed to fit within the first and having flat faces Z and a screw-threaded extension Z'. These are placed one within the other and secured together in any other suitable way. The cylindrical extension Y' is preferably utilized for the inner thread which engages with the valve casing and also serves as a washer seat for the washer $Y^2$. The screw-threaded extension Z' serves as a means of attachment for the dust cap (not shown). This gives a point of connection for the dust cap which necessarily must be of greater internal diameter than the exterior diameter of the valve casing, due to the fact that it must pass over the cap, so that the latter may remain in place during running conditions.

I do not herein claim the rim nut herein shown and described, as this forms the subject matter of a divisional application, Serial Number 294,266, filed by me May 2, 1919.

While I have shown and described one form of the invention, it will be understood that I do not wish to be limited thereto, since various changes may be made therein without departing from the spirit of the invention.

What I claim is:—

1. An adapter for tire valves having a screw-thread to engage the tire valve with a different thread to engage a pump coupling, and a movable deflator adapted to be actuated to open the valve.

2. An adapter for tire valves having a screw-thread to engage the tire valve with a different thread to engage a pump coupling, and a movable deflator having a gage-engaging portion adapted to be actuated to open the valve and permit the passage of air to the gage.

3. An adapter for tire valves having a screw-thread to engage the tire valve with a different thread to engage a pump coupling, and a movable deflator having a passage through it and adapted to be actuated by a gage to depress the valve and permit passage of air to the gage.

4. In a valve for tires or the like, the combination of an adapter having a thread to fit the valve casing and a thread to fit a pump coupling with a valve cap, the cap and adapter having means for detachable engagement.

5. In a valve for tires or the like, the combination of an adapter having a thread to fit the valve casing and a thread to fit a pump coupling with a valve cap, the cap and adapter having means for detachable engagement, said means comprising an exterior thread on the cap and an interior thread on the adapter.

6. In a valve for tires or the like, the combination of a valve cap and an adapter, the parts constructed so that the adapter fits over the exterior of the cap, and the parts having means for detachably engaging each other.

7. In a valve for tires or the like, the combination of a valve cap having a screw-driver projection, and an adapter fitting over the valve cap and having a recess for receiving the screw-driver projection.

8. In a vale for tires or the like, the combination of a valve cap, having a hollow screw-driver projection, and an adapter having a deflator, the adapter having a recess to receive the screw-driver projection of the cap, and the screw-driver projection having a recess to receive the deflator.

9. In a valve for tires or the like, the combination of a valve cap, having a hollow screw-driver projection, and an adapter having a deflator, the adapter having a recess to receive the screw-driver projection of the cap, and the screw-driver projection having a recess to receive the deflator, and the cap and adapter having complemental screw-threads for detachable connection.

10. In a valve for tires or the like, the combination of a valve cap having a hollow screw-driver projection, and having an exterior thread, and an adapter having an interior thread adapted to engage the exterior thread of the cap, and said adapter having a recess into which said screw-driver projection fits, and said adapter having a hollow deflator adapted to fit within the recess of the screw-driver projection.

In witness whereof, I have hereunto signed my name.

HENRY P. KRAFT.